INVENTOR.
JOHN H. STROOP

INVENTOR.
JOHN H. STROOP

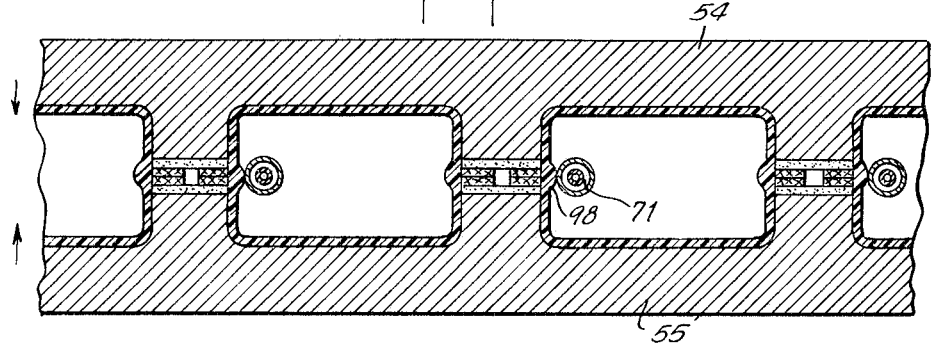
Fig. 6.
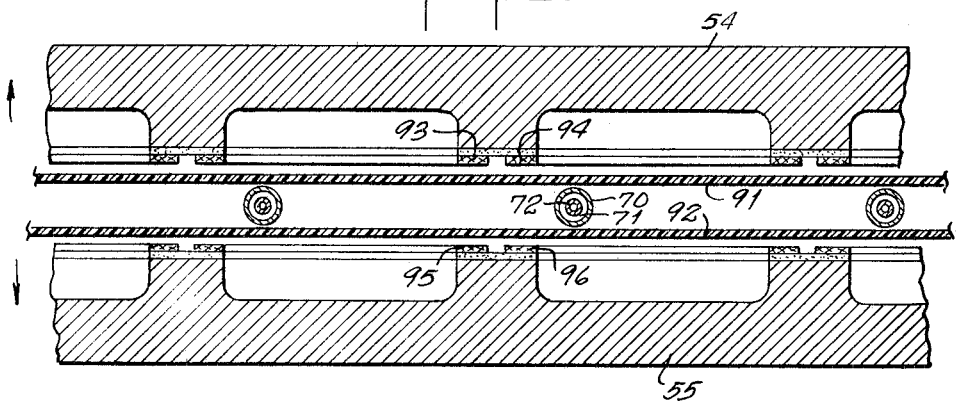
Fig. 5.
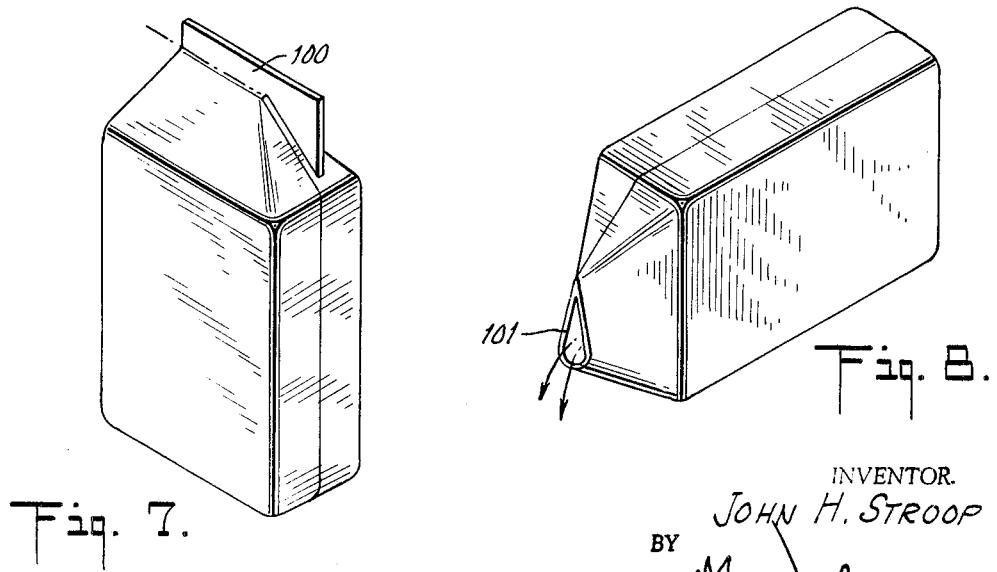
Fig. 7.
Fig. 8.
INVENTOR.
JOHN H. STROOP
BY
ATTORNEY

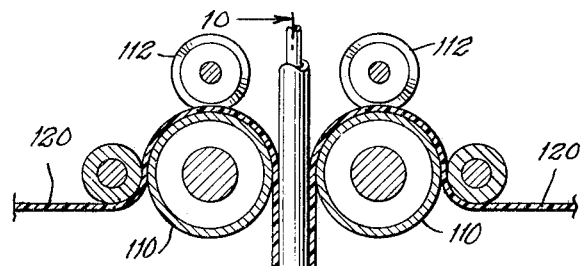
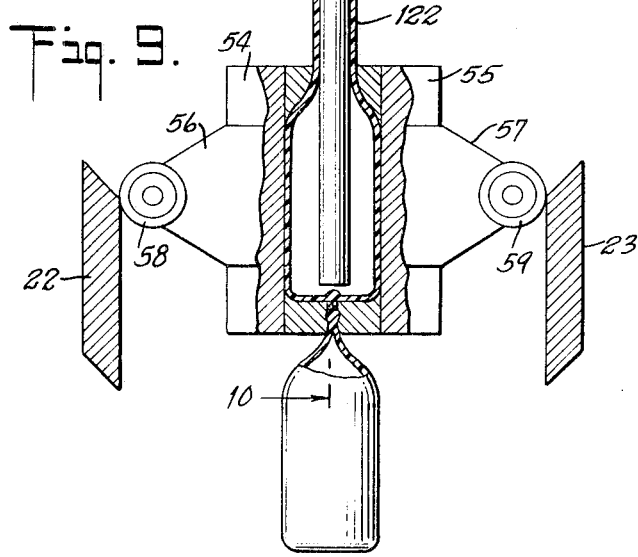
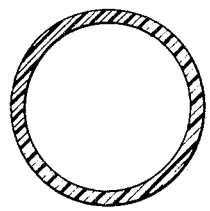
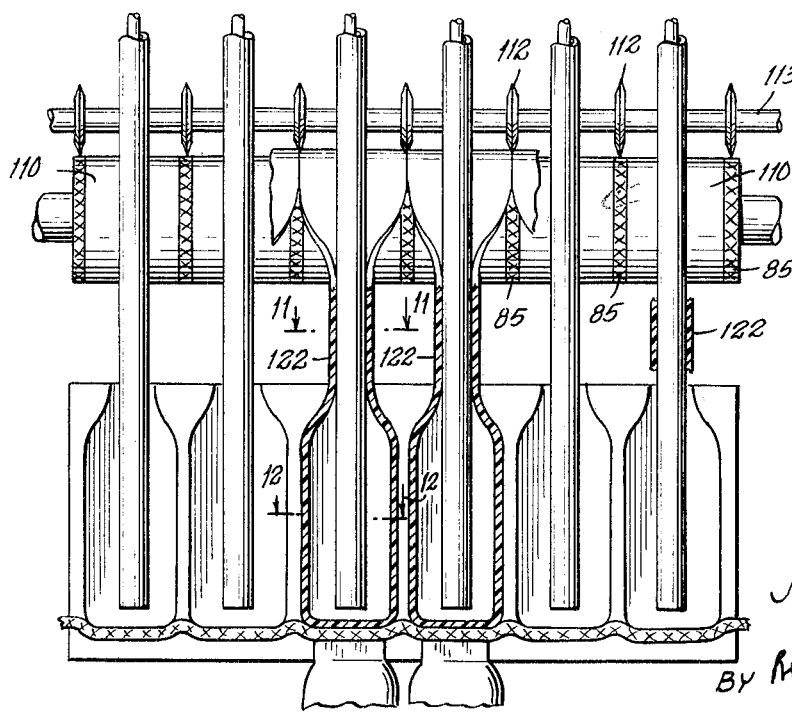

April 14, 1970 J. H. STROOP 3,505,705
APPARATUS FOR PRODUCTION AND FILLING OF FLANGELESS
PLASTIC CONTAINERS
Filed Dec. 28, 1966 7 Sheets-Sheet 6
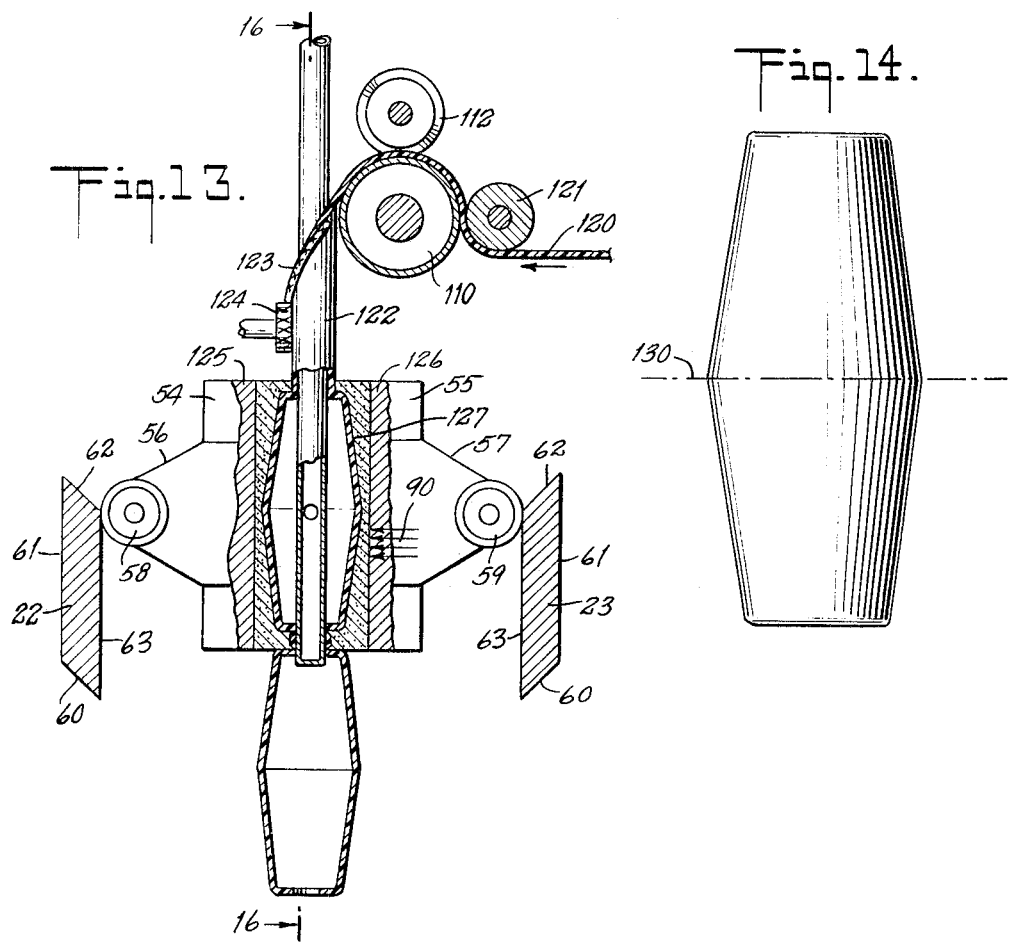
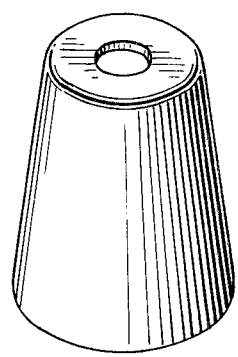
INVENTOR.
JOHN H. STROOP
BY
ATTORNEY April 14, 1970  J. H. STROOP  3,505,705
APPARATUS FOR PRODUCTION AND FILLING OF FLANGELESS
PLASTIC CONTAINERS
Filed Dec. 28, 1966  7 Sheets-Sheet 7

INVENTOR.
JOHN H. STROOP

United States Patent Office 3,505,705
Patented Apr. 14, 1970

3,505,705
APPARATUS FOR PRODUCTION AND FILLING OF FLANGELESS PLASTIC CONTAINERS
John H. Stroop, New York, N.Y., assignor to Total Packaging Inc., New York, N.Y., a corporation of New York
Filed Dec. 28, 1966, Ser. No. 605,462
Int. Cl. B29d 23/00, 31/00
U.S. Cl. 18—5                                      5 Claims

ABSTRACT OF THE DISCLOSURE

A machine to thermo-mold and weld flangeless containers from plastic sheeting, having means for feeding various combinations of hot plastic sheeting between co-operating die-sets and molding the hot sheeting to the internal contour of the dies, means for elevating the temperature of the weld areas of the hot plastic to its melt-flow temperature to permit the plastic to flow together and extrude or mold at the closing area of the die-sets and form a flat flangeless weld on the container.

BACKGROUND OF THE INVENTION

This invention is an improvement on my invention disclosed in Ser. No. 514,595, filed Dec. 17, 1965, now Patent No. 3,423,902. The improvement involves complete elimination of flanges at the seams where the container halves are united.

SUMMARY OF THE INVENTION

One object of this invention is to flangelessly melt-weld the peripheral areas of containers being produced from two webs of thermoplastic material with special heater means.

Another object of the invention is to produce containers from two rolls of material by flangelessly melt-welding tubes for blowing.

Another object is to produce containers from one roll of plastic material by flangelessly melt-welding tubes for blowing.

Another object of this invention is to produce thermoplastic packages in the form of double conical shapes which may be made into cups or bobbins by cutting the double conical containers transversely at the center.

Another object is to provide electric heating elements which preferably are located at the seams and may be interconnected when employed in the manufacture of a series of like containers in a single operation.

Another object is to provide for the production of a large number of bottle-shaped containers which may be completed by merely cutting off the closed tops.

BRIEF DESCRIPTION OF THE DRAWINGS

FIG. 5 is a view which is similar to FIG. 6 but is taken before the jaws of the dies which form the finished containers are fully closed.

FIG. 6 is a sectional plan view on the line 5—5 of FIG. 4.

FIGS. 7 and 8 show slightly different forms of containers which may be produced in the machine of the previous figures.

FIG. 9 is a view which largely corresponds to FIG. 3 but is adapted to produce a multiple of bottle-shaped containers from two webs of thermoplastic material. The webs are cut and fused into tubes so that the individual containers are each formed into a bottle shape of the desired size and form.

FIG. 10 is a partially sectional elevation at right angles to FIG. 9 and taken on the line 10—10 of FIG. 9.

FIG. 11 is a sectional detail taken on the line 11—11 of FIG. 10.

FIG. 12 is a sectional detail taken on the line 12—12 of FIG. 10.

FIG. 13 differs from the previous figures in that a single web instead of a pair of webs is employed in the production of the containers. This view also shows the production of containers having a double frusto-conical form with the large diameter at the center and the smaller diameters at the ends. These containers may be formed either, as shown in FIG. 14 completely closed, or as shown in FIG. 15 with a hole in the small end. As indicated in FIG. 14, the finished packages may be cut in two parts at the center line, thus producing two uniform drinking cups, or if a hole is provided in the small end as shown in FIG. 15, the device is then suitable for use as a bobbin in textile manufacture.

DESCRIPTION OF THE PREFERRED EMBODIMENTS

Figure 1:
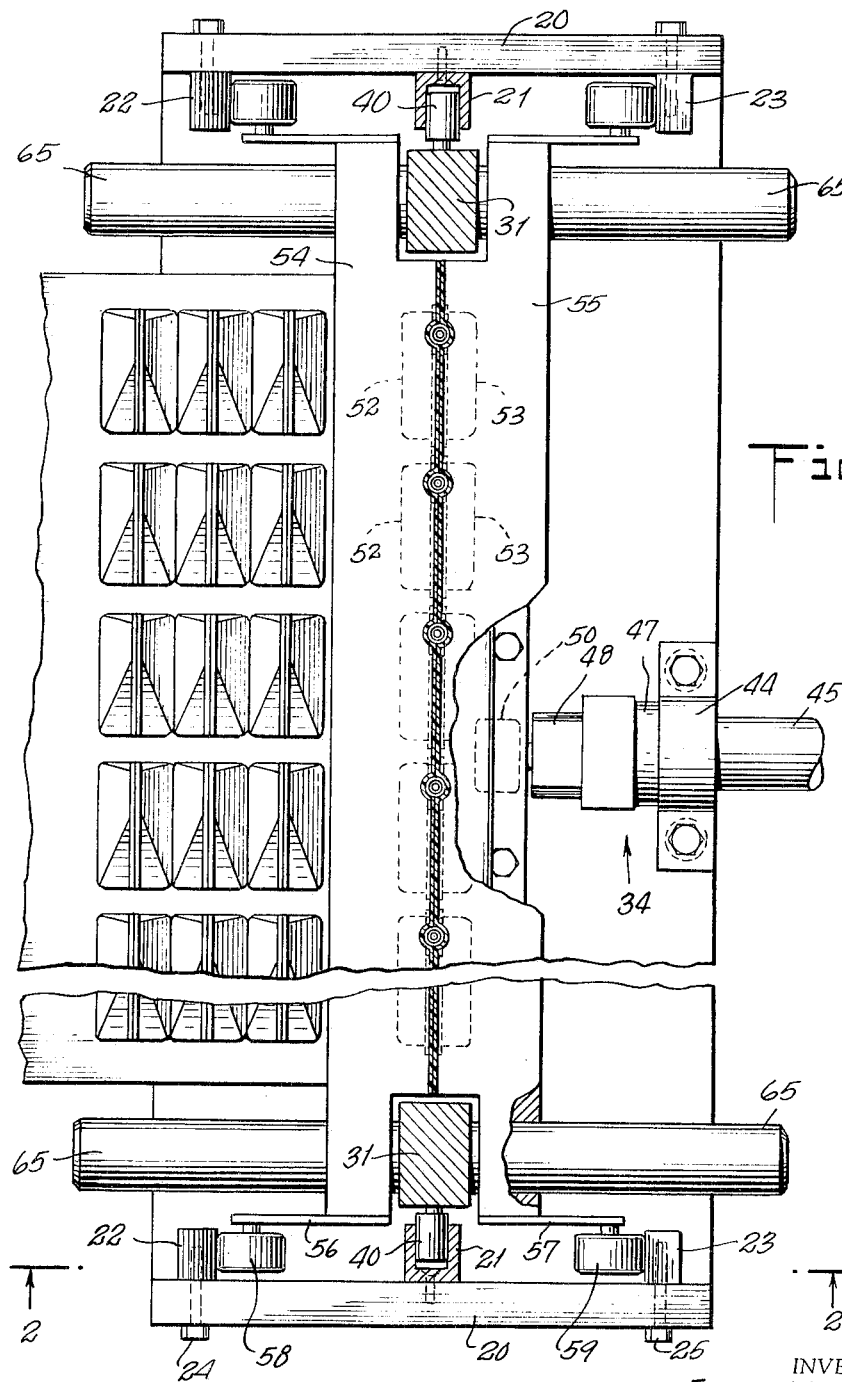
FIG. 1 is a partially sectional plan view of a machine for producing and filling a plurality of plastic containers at the same time.
Figure 2:
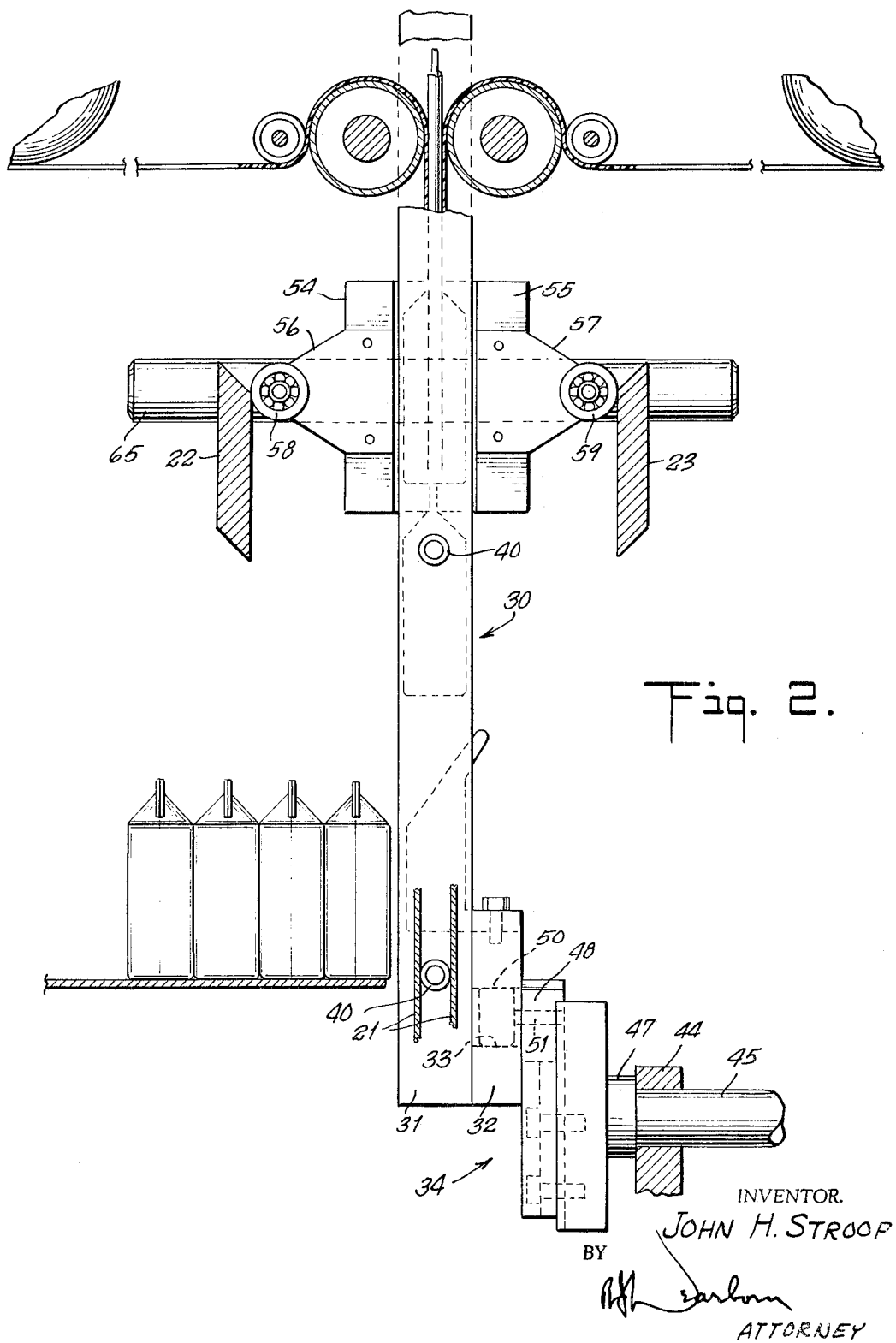
FIG. 2 is a partially sectional elevation taken on the line 2—2 of FIG. 1.
Figures 3, 4:
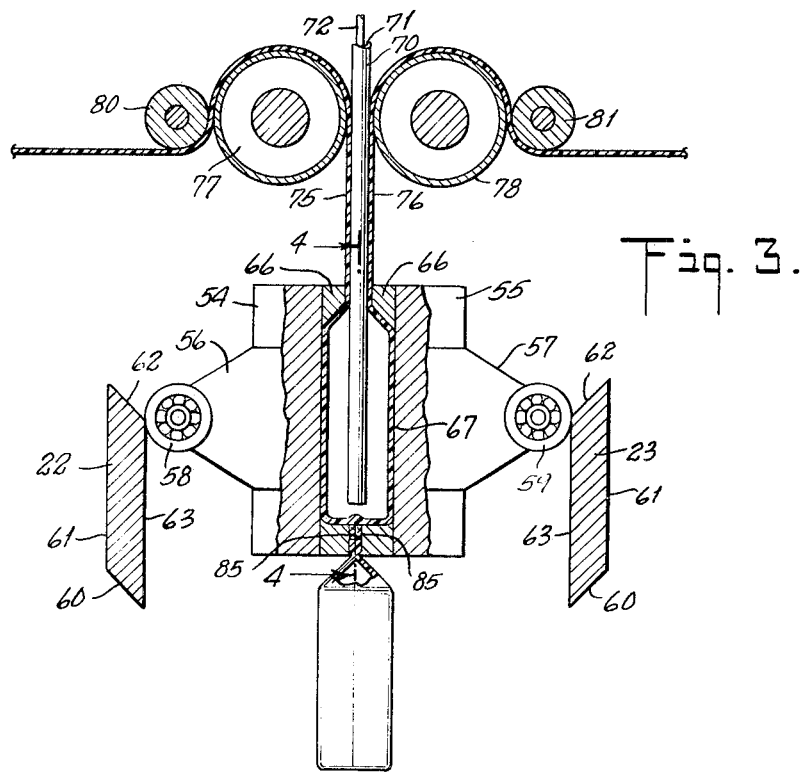
FIG. 3 is a partially sectional elevation showing the relation between the jaws of the mold and the cams by which the mold sections are opened and closed.
FIG. 4 is a sectional elevation at right angles to FIG. 3 taken on the line 4—4 of FIG. 3 and showing a plurality of containers which are produced and filled as a group at the same time.
Figure 16:
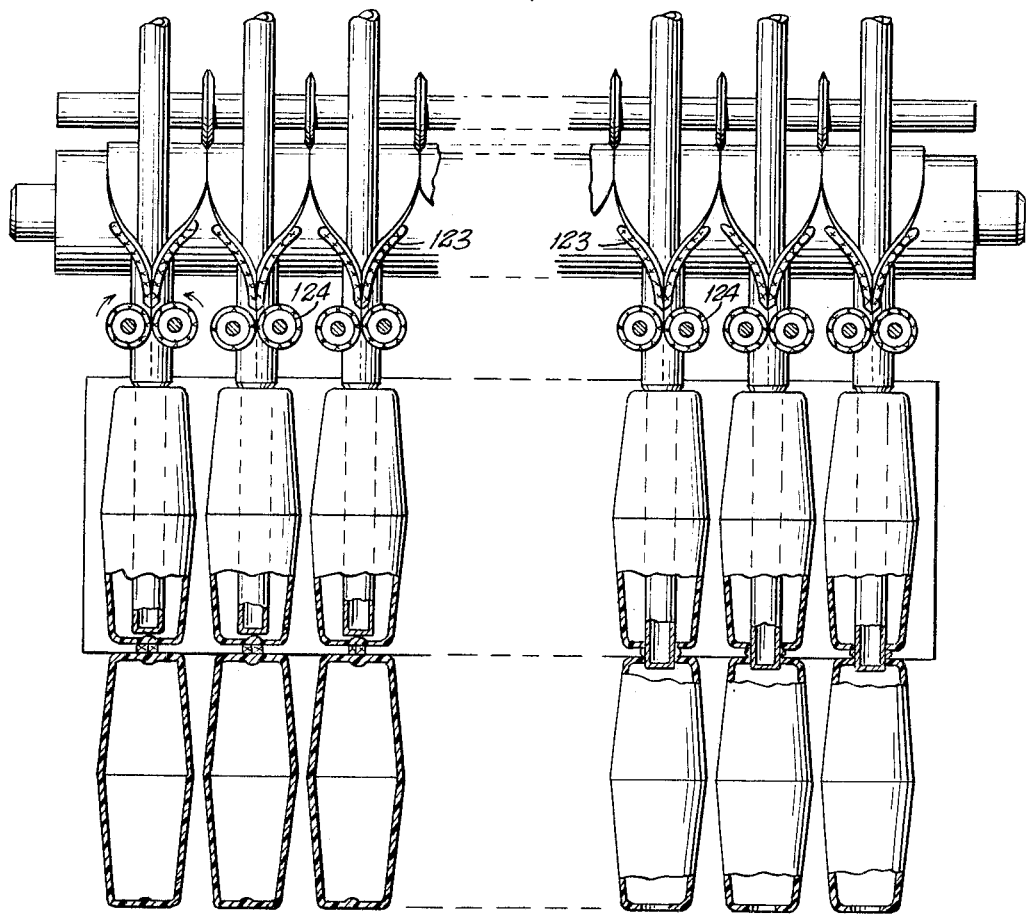
FIG. 16 is a partially sectional elevation on the line 16—16 of FIG. 13 and is taken at right angles to the plane of FIG. 13.
Figure 17:
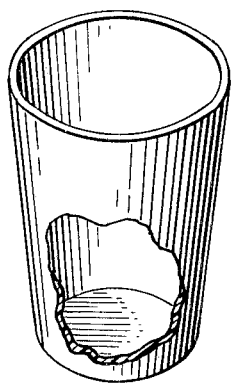
FIG. 17 is a perspective view of one of the cups produced by cutting the double frusto-conical container of FIG. 14 in two parts.

Referring specifically to FIGS. 1, 2 and 3, the machine is composed of stationary side frames 20 to which are attached vertical guides 21, and each frame has two cams 22 and 23 affixed thereto by bolts 24 and 25, as clearly shown in FIG. 1.

The structure generally comprises a platen frame 30 having side beams 31 interconnected at the bottom by a drive beam 32 having a slot 33. This platen frame with everything supported thereby is reciprocated vertically up and down by a crank mechanism 34. The platen frame is guided in its up-and-down movement by guide rollers 40 which extend outwardly into grooves of guides 21, as clearly shown in FIG. 1.

The crank mechanism 34 comprises a drive shaft 45 mounted to rotate in a stationary bearing 44 and has a boss 47. An arm 48 which is composed of two telescoping parts is attached to a base plate (not shown). A roller or cam follower 50 is rotatably mounted on a pin 51 attached to the arm 48, the cam follower 50 being located in the slot 33.

The stroke of the crank, which is the measure of the distance between the center line of drive shaft 45 and the center line of the pin 51 on which the cam follower 50 is mounted, may be adjusted by reason of the fact that the arm 48 is formed of two telescoping parts which may be clamped firmly in position to establish the desired stroke of the crank.

The rotation of the drive shaft 45 permits cam follower 50 to slide freely in the slot 33 and causes the platen frame 30 to reciprocate upwardly and downwardly for the purposes hereinafter explained.

The platen frame 30 supports a pair of platen guide pins 65 on which a mold structure having jaws 54 and 55 is slidably mounted. Individual molds may be formed in any reasonable number or on the mold structure so as to greatly multiply the capacity of the machine to turn out finished packages. Molds 52 and 53 for six packages are shown in the drawings on the mold structure and in FIG. 4, but only one of the six molds is shown in detail in FIGS. 2, 3, 9 and 13.

Referring specifically to these figures, the mold structure comprises a pair of jaws 54 and 55 which are provided with extensions 56 and 57 on which rollers or cam followers 58 and 59 are mounted. These cam followers 58 and 59 cooperate with the surfaces of stationary cams 22 and 23. The jaws of the mold structure are slidably mounted on the guide pins 65 which are rigidly attached to the side beams 31 of the platen frame 30.

An upward movement of the platen frame first produces an upward movement of the cam followers 58 and 59 outward and upward along cam surfaces 60 and 61. Further movement of the cam followers causes them to pass over cam surfaces 62 and down on cam surfaces 63. While the cam followers are traversing cam surfaces 60 and 61, the jaws of the mold are in the open position and are substantially spaced apart from one another.

However, as the cam followers traverse surfaces 62 and then surfaces 63, the jaws of the mold are moved toward one another into the position shown in FIGS. 2 and 3.

As clearly shown in FIG. 1, the jaws 54 and 55 of the mold structure of a machine adapted to handle six packages simultaneously are supported from the platen frame 30 by the spaced platen guide pins 65 which are anchored in the side beams 31, platen jaws 54 and 55 being mounted to slide on the guide pins when they are moved in response to the action of the cams 22 and 23, as already explained.

Referring specifically to FIGS. 3, 4, 5 and 6, the jaws 54 and 55 carry identical halves 66 of molds in which containers 67 are formed.

A multipassage tube 70 having an outer passage 71 and an inner passage 72 extends between plastic webs 75 and 76 which are fed over rolls 77 and 78 and are guided against the surface of the rolls 77 and 78 by guide rolls 80 and 81. The length of the tube 30 is sufficient to extend close to the bottom of the container 67 which is being formed by the jaws of the mold. Air or other suitable gas is first supplied through the outer passage 71 thereby forcing the thermoplastic sheets into the jaws of the mold, after which the inner passage 72 may be used to supply liquid product to be packaged, such as for example milk or oil. During this part of the operation the outer passage 71 is attached to a source of vacuum (not shown) which is controlled to insure that the package is completely filled with the liquid product and to avoid formation of bubbles. A granular substance may be introduced instead of a liquid product and used to fill the containers.

Referring to FIG. 4, the edges where the two halves of the container are welded together have immediately associated with them electric heaters 85 which are prferably in the form of narrow ribbons, and the heaters for the multiple units which are produced at each activation of the jaws of the mold may be interconnected in series by suitable connectors 86. These heating elements 85 impart heat just at the edges where flanges would otherwise be formed, and the temperature is adjusted so that the thermoplastic material is softened and excess is squeezed out on the outside leaving a continuous joint free from any flange, and on the inside a slight bead is usually left, as shown in FIG. 3.

The extension of this continuous Nichrome resistance element, which takes the form of a ribbon, around the entire seam where the two halves of the container are to be welded, makes it possible to apply intense heat during a very short period of time as the matched dies are closing. This intense heat is preferably prevented from heating the jaws of the guides by forming them with platen backup material which is composed of a porous inert material and is cooled by applying cryogenic mist, as indicated by the arrows at 90 in FIG. 13. This intense heat totally fluidizes plastic webbing in contact with the heaters, and as the die comes to a zero closing position this fluidized plastic is extruded inwardly away from the closing areas, thus producing a complete fusion of the two halves around this configuration so as to produce a flangeless welded container.

By the application of variable voltage to the Nichrome heating elements, the temperature may be raised to whatever level is required for the fluidation of the plastic material. All of the elements in this structure are of vital importance. It is necessary to have a very thin section of Nichrome which preferably is in the form of a ribbon so that the rate of rise of temperature is very rapid relative to the mass of metal in the Nichrome element.

The ceramic base isolates the Nichrome element from the metallic jaw members, and it is made of an insulated material with sufficient dielectric capacity to isolate the circuit, but equally important is its capacity to resist the transfer of the heat from the heater element to the metallic base. It is highly important to prevent the transmission of heat in the direction of the metallic base, because it is desired to transmit the heat in the opposite direction to the plastic material which is being fluidized. It will be understood that it is highly desirable that this multiple packaging machine be operated at high speed, and in order that this may be accomplished the heaters must act almost simultaneously by the close of the circuit through the heaters just at the moment when the jaws of the mold are forced together in the forming of the thermoplastic container.

Referring specifically to FIGS. 5, 6, 7 and 8, FIG. 5 shows the jaws approaching closing position but prior to the blowing out of the plastic webs which are here for convenience marked 91 and 92. Electric heating elements are here shown at 93 and 94 on one of the jaws of the mold, and 95 and 96 on the opposite jaw of the mold.

The next important step in the procedure is shown in FIG. 6, where the thermoplastic curtain webs have been expanded by compressed air or other similar gas introduced through the outer opening 71 of the tube 70, and at the same instant that the jaws are brought together the heaters 93, 94, 95 and 96 are vitalized by the application of sufficient voltage that the webs are melted and the seams formed as shown without any flange on the outside and with a small bead 98 on the inside. This bead may be exceedingly small and is somewhat enlarged in FIG. 6 in order that the structure may be more readily seen. This bead is on the inside of the seam and does not in any way interfere with the acceptability of the containers being formed in the molds.

In FIG. 7 a partially finished container in perspective is shown, which has a tear strip 100 at one end which, as indicated in FIG. 8, may be removed to provide a pour spout opening at 101.

Referring specifically to FIGS. 9 and 10, the mold is shaped with a flat bottom end and a curved neck which in the finished product has the shape of a round bottle and may be used for packaging milk or other liquids. The seams of the bottle-shaped container are produced by welding two webs 120 into a tube 122, without any outwardly extending flange.

Referring now to FIG. 10, double thermoplastic webs 120, each of adequate width to cover the entire length of heating rolls 110, are severed into individual strips adapted to be formed first into tubes, by a plurality of cutters 112 mounted on a shaft 113, the arrangement being such that the individual strips are then fused by heaters 85 into tubes around the individual multipassage feed tubes which are then blown out to fill the jaws of the mold at the bottom and thus have cross-sectional configurations, as shown in FIG. 11, taken on line 11—11 of FIG. 10, and in FIG. 12 taken on the line 12—12 of FIG. 10. In the production of containers by the mechanism of FIG. 10, the containers are bottle-shaped.

Referring to FIG. 13, a single wide web 120 of thermoplastic material is fed around guide roll 121 and over heating roll 110 where it is subjected to cutters 112 and the individual strips first formed are shaped into tubes. 122 and subjected to electric heating elements 123 and forming rolls 124. These elements are so arranged that the tube 122 is closed by the welding of the single open side without producing any outwardly extending flange. The tube 122 then proceeds downwardly between the jaws 125 and 126 of the mold into which the tubes are blown to form a bevel frusto-conical thermoplastic container 127. This structure has the largest diameter in the center and tapers each way toward the ends which are of smaller diameter, as shown in FIG. 14. These units may be formed with holes in the small ends by making the multipassage tubes of sufficient length, as shown in FIG. 13, or the multipassage tube may be made shorter and the small ends of the container closed. If they are closed, a central transverse saw cut 130 will produce a pair of drinking cups, or if the holes are made in the small ends of the containers, they may be used as bobbins in textile production.

I claim:
1. A blow-molding machine for welding flangeless containers from plastic sheeting, comprising means for feeding a pair of spaced thermoplastic sheet; a pair of cooperating jaw molds, one on either side of the sheets, for molding said sheets to the internal contour of the molds; means for opening and closing the jaw molds; a blow tube disposed between such sheets; means for supplying gas under pressure through said blow tube to force the sheets into the jaw molds just before they are closed; heating means attached to the molds along the entire seam location for applying heat solely at the edges of said sheets; and means for activating the heating means for only a very short time as the jaw molds are being closed so as to permit the plastic to flow together and be inwardly extruded at the closing area of the jaw molds, thereby to produce a complete fusion along the seam so as to form a flangeless weld on the containers.

2. A machine as defined in claim 1, in which said blow tube has at least two passages, one for supplying gas under pressure to force the sheets into the molds, and the other for filling the containers immediately that they are formed in the molds.

3. A machine as defined in claim 1, in which said heating means comprises a plurality of narrow Nichrome strips disposed at the closing area of said jaw molds.

4. A blow-molding machine for welding flangeless containers from plastic sheeting, comprising means for feeding at least one plastic sheet, including means for forming a plastic tube therefrom; a pair of cooperating jaw molds for molding said tube to the internal contour of the molds; means for opening and closing the jaw molds; a blow tube and means for supplying gas under pressure through said blow tube; heating means attached to the molds along the entire seam location for applying heat solely at the edges of said plastic tube; and means for activating the heating means for only a very short time as the jaw molds are being closed so as to permit the plastic to flow together and be inwardly extruded at the closing area of the jaw molds, thereby to produce a complete fusion along the seam so as to form a flangeless weld on the containers.

5. A machine as defined in claim 4, in which said plastic tube is formed from two plastic sheets.

References Cited

UNITED STATES PATENTS

| 2,991,500 | 7/1961 | Hagen. | |
| 3,099,043 | 7/1963 | Held. | |
| 3,142,089 | 7/1964 | Wilkalis et al. | |
| 3,243,330 | 3/1966 | Zelnick | 156—515 X |
| 3,347,733 | 10/1967 | Elver | 156—515 |
| 3,355,345 | 11/1967 | Braun | 156—515 X |
| 3,399,508 | 9/1968 | Frielingsdorf et al. | |

WILBUR L. McBAY, Primary Examiner

U.S. Cl. X.R.

18—19; 53—140, 178, 182; 156—500, 515